(12) United States Patent
Turner et al.

(10) Patent No.: US 6,704,166 B1
(45) Date of Patent: Mar. 9, 2004

(54) COATED LATCH MECHANISM FOR DISK DRIVE

(75) Inventors: Robert D. Turner, Thornton, CO (US); Scott H. Deits, Littleton, CO (US)

(73) Assignee: Maxtor Corporation, Longmont, CO (US)

(*) Notice: Subject to any disclaimer, the term of this patent is extended or adjusted under 35 U.S.C. 154(b) by 206 days.

(21) Appl. No.: 09/886,502

(22) Filed: Jun. 20, 2001

Related U.S. Application Data

(60) Provisional application No. 60/223,445, filed on Aug. 4, 2000.

(51) Int. Cl.[7] ............................................. G11B 21/22
(52) U.S. Cl. ..................................................... 360/256
(58) Field of Search ............................ 360/256–256.9, 360/97.01–97.04, 254.1–254.9; 200/6 R; 337/89

(56) References Cited

U.S. PATENT DOCUMENTS

| | | | | |
|---|---|---|---|---|
| 3,573,696 A | * | 4/1971 | Shaw | ........................... 337/89 |
| 4,308,434 A | * | 12/1981 | Roeser | ....................... 200/6 R |
| 5,262,913 A | * | 11/1993 | Stram et al. | |
| 5,365,389 A | * | 11/1994 | Jabbari et al. | |
| 5,495,376 A | * | 2/1996 | Wasson et al. | |
| 5,742,453 A | | 4/1998 | MacPherson | |
| 5,812,345 A | | 9/1998 | MacPherson et al. | |
| 6,069,766 A | * | 5/2000 | Battu et al. | ............... 360/97.01 |
| 6,268,982 B1 | * | 7/2001 | McGrath et al. | .......... 360/254.7 |

* cited by examiner

Primary Examiner—Allen Cao
(74) Attorney, Agent, or Firm—Sheridan Ross P.C.

(57) ABSTRACT

A contact type or active latch mechanism for a disk drive has at least one contacting surface coated with a soft metal. The soft metal coating helps to prevent particle generation which might otherwise occur because of repeated contact by contacting surfaces of the latch mechanism. The soft metal is applied at a thickness which enables the coating to yield and flow under the contact loads experienced. Thus, the coating compensates for the plastic stress region of the latching mechanism which must plastically deform in response to contact. The soft metal coating also provides lubrication and eliminates the need to apply a separate application of lubrication between contacting surfaces of the latch mechanism.

23 Claims, 1 Drawing Sheet

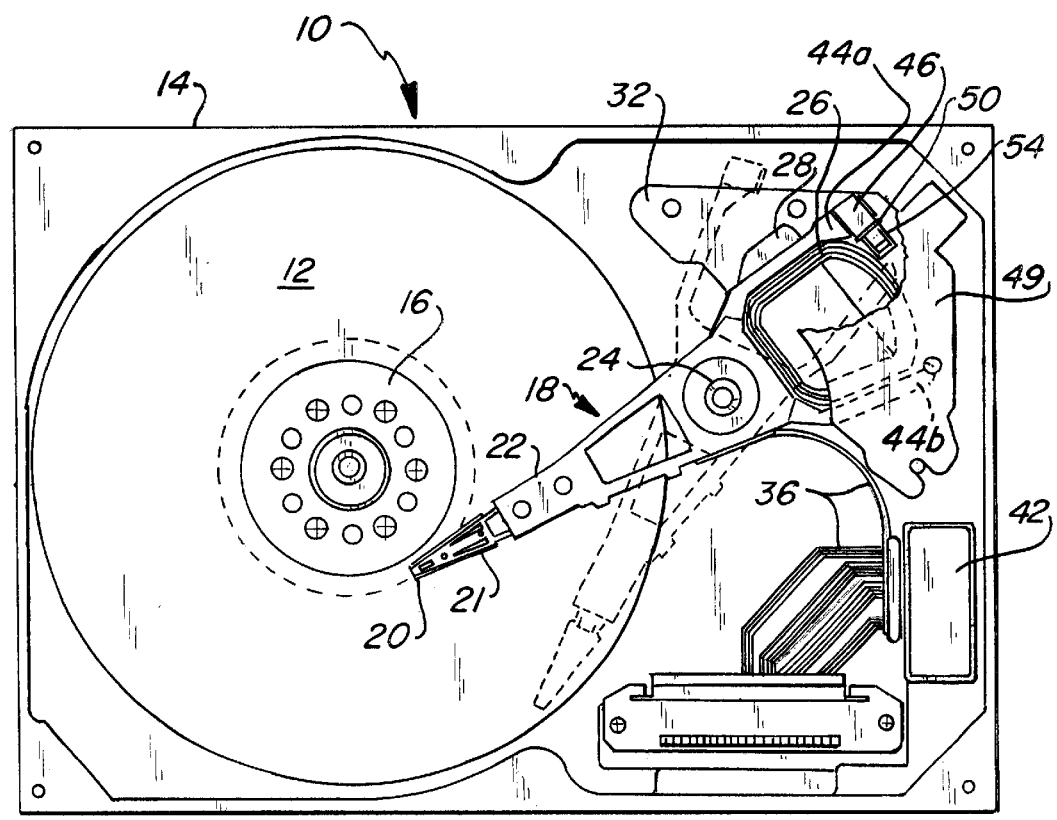
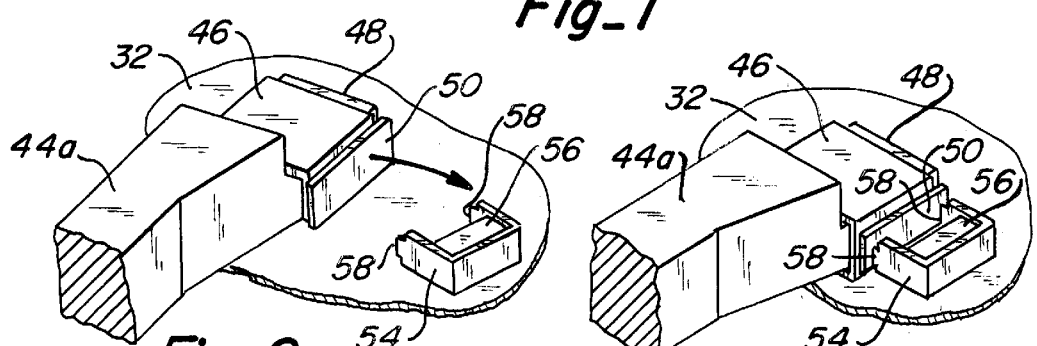

COATED LATCH MECHANISM FOR DISK DRIVE

CROSS REFERENCE TO RELATED APPLICATIONS

Priority is claimed from U.S. Provisional Patent Application No. 60/223,445 filed on Aug. 4, 2000 and entitled "METALLIC SOLID LUBRICATED LATCH PLATE", the disclosure of which is incorporated herein by reference in its entirety.

FIELD OF THE INVENTION

The present invention relates to the field of computer disk drives, and more particularly, the invention relates to a latch mechanism for latching a read/write head actuator of a disk drive wherein at least one contacting surface of the latch mechanism includes a soft metallic coating or plating to reduce friction and particle generation.

BACKGROUND OF THE INVENTION

In a typical computer disk drive, an area of each disk serves as a landing area for the read/write heads. The disk drive employs a latching mechanism to hold the read/write heads over the landing area during spin-up, spin-down, and power down of the disk drive. The landing area is a portion of the disk not used for data storage. Typically, the landing area is located on the disk tracks closest to the center of the disk. The failure to latch the read/write heads during spin-up, spin-down, or power down of the disk drive results in the read/write heads bouncing on or otherwise improperly contacting data areas on the disk which results in corruption of stored data, and damage to the disk.

A number of prior art latching mechanisms exist. One type or category of latching mechanism is one which requires physical contact of a portion of the actuator assembly against a latch stop. Another type of latching mechanism is one which utilizes magnetic flux for capturing and holding a latch tab of the actuator assembly without contacting a latch stop. While some non-contact latching mechanism may be adequate for their intended purposes, one problem associated with such mechanisms is that they suffer from wide variations in latching force due to manufacturing tolerances which do not allow repeatability in terms of creating a latching force of consistent magnitude. For contact type latching mechanisms, while some of these may be adequate for their intended purposes, many of these devices suffer from being structurally complex and difficult to manufacture, thus adding unnecessary complexity and cost to the disk drive as a whole.

One example of a passive non-contact magnetic latch is disclosed in the U.S. Pat. No. 5,742,453. This reference discloses a magnetic latch which has a magnetic circuit for capturing a latch tab of an actuator assembly. Magnetic flux lines traverse the latch tab in a direction substantially perpendicular to a direction of movement of the latch tab.

An example of a contact latch mechanism is disclosed in U.S. Pat. No. 5,812,345. The latch mechanism of this invention utilizes a permanent magnet to bias an elongated rotatable latch arm into engagement with the actuator when the actuator is positioned in the landing zone. An electromagnetic coil, positioned between the magnet and the magnetic return plates, when energized, counters this bias permitting the latch arm to rotate out of engagement with the actuator. Other examples of latching mechanisms include those disclosed in U.S. Pat. Nos. 5,363,261; 5,381,290; 5,377,065; and 5,379,171.

For contact or active latching mechanisms, repeated cycles of contact between contacting elements can cause surface cracking and material failure resulting in particle generation which can contaminate the disk drive. Some disk drives may include contacting surfaces plated with chromium or other high strength, low modulus metals. Over time, such chromium platings are particularly susceptible to developing microcracks causing particle generation. Attempts have been made to apply a liquid lubricant to contacting surfaces of a latch mechanism, such lubricants including Zdol™ and Fombilin™. However, use of any liquid lubricant to reduce friction may actually result in increased contamination. Therefore, use of liquid lubricants has its disadvantages. Consequently, there is a need for an active or contact latch design which reduces particle generation, yet still provides inherent lubrication.

SUMMARY OF THE INVENTION

In accordance with this invention, a latch mechanism is provided wherein at least one contacting surface is plated or coated with a soft metal. The soft metal is able to yield and flow under the very high contact loads experienced during disk drive operation, thus preventing particle generation yet providing lubrication at the contact points. In addition to silver, other soft metals may be used to include tin, lead, copper, indium, gold, palladium, platinum, and several of their alloys. In the type of specific latching mechanism disclosed herein, it is preferable to apply the soft metal coating to the latch plate.

The preferred method of applying the coating to the latch plate is electroplating. However, other methods of applying the soft metal coating are contemplated which include sputtering, metal evaporation and cladding.

Preferably, the coating should be thick enough to yield and flow under contact so that the loads transmitted through the coating to the underlying latch do not exceed the plastic stress limits of the latch. Typically, the latch plate is made from stainless steel. In order to accommodate the subsurface plastic contact stress region of a stainless steel latch plate, the thickness of the coating should preferably be in the range from 1 to 20 microns. However, it shall be understood that a coating of a lesser or greater thickness can be used advantageously, and this preferred range of thickness should not be interpreted as a critical range thickness.

The figures discussed below disclose one particular type of disk drive latching mechanism; however, it shall be understood that the coating used on the latch plate disclosed herein can be used with any type of active or contact latch mechanism to reduce particle generation and to provide lubrication.

By the application of a soft metal coating or plating over contact surfaces of a latching mechanism, lubrication can be provided, and particle generation can be minimized without having to redesign the latch mechanism or to make other design changes in the disk drive.

Other objects, features and advantages of the present invention will be apparent from the accompanying drawings, taken with the detailed description that follows below.

BRIEF DESCRIPTION OF THE DRAWINGS

FIG. 1 is a plan view of one type of disk drive utilizing an active or contact type latching mechanism;

FIG. 2 is a greatly enlarged fragmentary perspective view of the actuator assembly having a latch plate mounted thereto, and separated from a latch stop; and FIG. 3 is another greatly enlarged fragmentary perspective view of the actuator assembly showing the latch plate in contact with the latch stop;

DETAILED DESCRIPTION

FIG. 1 shows a plan view of a disk drive assembly 10, with the top cover removed. FIG. 1 is representative of any number of common disk drives. The disk drive assembly 10 illustrated herein includes at least one disk/platter 12, typically having magnetic media on both the upper and lower surfaces thereof. The disk 12 along with other components of the disk drive are housed within a housing 14. The disk 12 is mounted over a hub 16 which is driven by a disk drive motor (not shown) enabling the disk to rotate at high rpms during operation. An actuator assembly 18 is shown rotatably mounted to an actuator pivot 24. Basic components of the actuator assembly 18 shown include one or more read/write heads 20 mounted on a flexure arm 21. Flexure arm 21, in turn, is attached to an actuator arm 22. In solid lines, the actuator assembly 18 is shown parked over the landing zone. The landing zone has been represented by the area of the disk 12 on or adjacent disk track 30. The landing area of the disk is allocated for takeoff and landing of the read/write heads 20 during spin-up and spin-down of the disk. The read/write heads 20 are also parked over the landing area during power down or during sudden movements of the disk drive. The actuator assembly 18 is rotated to a desired disk track by a voice coil motor shown as voice coil 26. The voice coil 26 is immersed in a magnetic field generated by the magnet 28. An actuator control circuit (not shown) causes current flow in the voice coil motor 26, and ultimately controls the position of the actuator assembly 18 by varying current through the voice coil. The dotted position of actuator assembly 18 illustrates the manner in which actuator assembly 18 rotates about actuator pivot 24 in response to the voice coil motor 26. The magnet 28 is mounted to a mounting plate 32. FIG. 1 also shows other common elements of a disk drive including a communications bus 36 which transfers electronic signals to and from the read/write heads 20. A filter 42 regulates and filters air passing in and out of the chamber defined by the housing 14 and the top cover (not shown). The yoke portion of the actuator assembly 18 is a generally "U" shaped member which carries the actuator voice coil 26. The yoke includes a pair of leg extensions 44a, 44b. Leg extension 44a has a latch plate 50 mounted thereto.

Now referring to FIG. 2, the free end of leg 44a is defined by latch arm end 48. The particular latching mechanism illustrated includes an elastomer ring 46 which is frictionally mounted over the latch arm end 48. Latch plate 50 is secured to the interior vertical surface of elastomer ring 46. A latch stop/crash stop 54 is mounted to mounting plate 32. For illustration purposes in FIG. 1, the latch cover 49 has been broken away to reveal the latch mechanism comprising the ring 46, latch plate 50,and latch stop 54. Latch plate 50 contacts latch stop contacting surfaces 58 of the latch stop 54 during spin-up, spin-down, or power down. When the disk drive is in operation, the latch late 50 is separated from the latch stop 54. A latch magnet 56 is disposed in the U-shaped slot of latch stop 54. The latch stop 54 is made of a magnetically permeable material which becomes magnetized by the latch magnet 56. The latch plate 50 is held against latch stop 54 by the magnetic force.

FIG. 3 simply illustrates the latch plate 50 latched against the latch stop 54.

Because of the flat design of latch plate 50, it is the element having the contact surface which is most easily coated or plated, particularly in an electroplating process. However, alternatively, the latch stop 54 could be the element which is coated with the soft metal.

Although it is only necessary to coat the side of the latch plate 50 which makes contact with the latch stop 54, in an electroplating process, the entire latch plate would most likely be coated.

While a specific type of latching mechanism has been illustrated, it shall be understood that the invention herein is intended to cover a soft metal plating or coating applied to contact surfaces of all types of contact type latching mechanisms. Accordingly, the latch plate 50 and latch stop 54 can be broadly defined as first and second contacting surfaces, respectively.

This invention has been described with respect to a particular disclosed embodiment; however, it will be understood that various other modifications can be effective within the spirit and scope of this invention.

What is claimed is:

1. A latch plate in a latching mechanism of a disk drive, said latch plate comprising:

a latch plate composed of a metallic material; and a soft metal coating applied to the latch plate wherein said coating yields and flows under contact loads being experienced during operation.

2. A disk drive latch plate, as claimed in claim 1, wherein:

said coating is a material selected from the group consisting of silver, tin, lead, copper, indium, gold palladium, or platinum.

3. A disk drive latch plate, as claimed in claim 2, wherein:

said group further includes alloys of the selected group.

4. A disk drive latch plate, as claimed in claim 1, wherein:

said coating is applied having a thickness between about 1 to 20 microns.

5. A disk drive latch plate, as claimed in claim 1, wherein:

said coating is applied having a thickness to compensate for a plastic stress region of the latch plate which plastically deforms in response to contact.

6. In a computer disk drive of the type including at least one disk, at least one read/write head for reading and writing data to and from said disk, and a latching mechanism for latching an actuator carrying the at least one read/write head, the improvement comprising:

a latch plate composed of a metallic material; and a coating applied to the latch plate wherein said coating yields and flows under contact loads experienced during operation.

7. The computer disk drive, as claimed in claim 6, wherein:

said coating is a material selected from the group consisting of silver, tin, lead, copper, indium, gold, palladium or platinum.

8. The computer disk drive, as claimed in claim 6, wherein:

said group further includes alloys of the selected group.

9. The computer disk drive, as claimed in claim 6, wherein:

said coating is applied having a thickness between about 1 to 20 microns.

10. The computer disk drive, as claimed in claim 6, wherein:

said coating is applied having a thickness to compensate for a plastic stress region of the latch plate which plastically deform in response to contact.

11. In a disk drive latching mechanism of the type including first and second contacting surfaces, the improvement comprising:

a soft metal coating applied to at least one of the first and second contacting surfaces wherein said coating yields and flows under contact loads experienced during operation.

12. A disk drive latching mechanism, as claimed in claim 11, wherein:

said coating is a material selected from the group consisting of silver, tin, lead, copper, indium, gold, palladium or platinum.

13. A disk drive latching mechanism, as claimed in claim 12, wherein:

said group further includes alloys of the selected group.

14. A disk drive latching mechanism, as claimed in claim 11, wherein:

said coating is applied having a thickness between about 1 to 20 microns.

15. A disk drive latching mechanism, as claimed in claim 11, wherein:

said coating is applied having a thickness to compensate for a plastic stress region of the latch plate which plastically deforms in response to contact.

16. A method of preventing particle contamination in a disk drive from particles generated by a contact type latching mechanism having contacting surfaces, said method comprising the step of:

coating at least one contacting surface of the contacting surfaces with a soft metal coating wherein said coating yields and flows under contact loads experienced during operation.

17. A method, as claimed in claim 16, wherein:

said coating is material selected form the group consisting of silver, tin, lead, copper, indium, gold, palladium or platinum.

18. A method, as claimed in claim 16, further comprising the step of:

coating at least one coating surface with a thickness which compensates for a plastic stress region of the latching mechanism which plastically deforms in response to contact between contacting surfaces.

19. A latch mechanism for latching an actuator of a disk drive, said latch mechanism comprising:

a latch plate mounted to the actuator, said latch plate being composed of a metallic material, said latch plate having a soft metal coating applied thereto wherein said coating yields and flows under contact loads experienced during operation; and a latch stop mounted in said disk drive for contacting said latch plate.

20. A latch mechanism, as claimed in claim 19, wherein:

said soft metal coating is a material selected from the group consisting of silver, tin, lead, copper, indium, gold, palladium or platinum.

21. A latch mechanism, as claimed in claim 20, wherein:

said group further includes alloys of the selected group.

22. A latch mechanism, as claimed in claim 19, wherein:

said soft metal coating is applied having a thickness of about 1 to 20 microns.

23. A latch mechanism, as claimed in claim 19, wherein:

said soft metal coating is applied having a thickness to compensate for a plastic stress region of the latch plate which plastically deforms in response to contact.

* * * * *